(12) United States Patent
Rune et al.

(10) Patent No.: US 10,230,534 B2
(45) Date of Patent: Mar. 12, 2019

(54) SERVICE LAYER CONTROL AWARE CONTROL SIGNALLING IN A COMMUNICATION NETWORK

(71) Applicant: TELEFONAKTIEBOLAGET L M ERICSSON (PUBL), Stockholm (SE)

(72) Inventors: Johan Rune, Lidingö (SE); Jari Vikberg, Järna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 320 days.

(21) Appl. No.: 14/892,240

(22) PCT Filed: May 31, 2013

(86) PCT No.: PCT/EP2013/061301
§ 371 (c)(1),
(2) Date: Nov. 19, 2015

(87) PCT Pub. No.: WO2014/191053
PCT Pub. Date: Dec. 4, 2014

(65) Prior Publication Data
US 2016/0094351 A1 Mar. 31, 2016

(51) Int. Cl.
*H04W 36/02* (2009.01)
*H04L 12/14* (2006.01)
(Continued)

(52) U.S. Cl.
CPC .......... *H04L 12/1485* (2013.01); *H04L 69/22* (2013.01); *H04W 4/24* (2013.01); *H04W 76/22* (2018.02)

(58) Field of Classification Search
CPC . H04L 2012/5684; H04L 69/22; H04W 36/02
See application file for complete search history.

(56) References Cited

U.S. PATENT DOCUMENTS

2005/0227690 A1* 10/2005 Noguchi ............... H04W 60/04
455/435.1
2007/0204050 A1* 8/2007 Liu ......................... H04L 47/14
709/230
(Continued)

FOREIGN PATENT DOCUMENTS

| EP | 1788769 A1 | 5/2007 |
| WO | 2007142565 A1 | 12/2007 |
| WO | 2012130308 A1 | 10/2012 |

OTHER PUBLICATIONS

ETSI TS 132 240 V8.6.0 Digital cellular telecommunications system (Phase 2+); Universal Mobile Telecommunications System (UMTS); LTE; Telecommunication management; Charging management; Charging architecture and principles (3GPP TS 32.240 version 8.6.0 Release 8), Jul. 2010.
(Continued)

*Primary Examiner* — Charles N Appiah
*Assistant Examiner* — Edward Zhang

(57) ABSTRACT

A method and apparatus for handling control signalling between a service layer control node and a Radio Access Network, the signalling being associated with a data flow of a User Equipment, the User Equipment being associated with a Radio Access Network node. The Radio Access Network node receives a data flow comprising a plurality of data packets sent using a bearer towards the User Equipment. It determines whether a data packet in the data flow includes an identifier indicating that the data packet relates to control signalling. A data packet that is found to relate to control signalling is removed from the data flow, to produce a modified data flow, which is sent towards the User Equipment. This allows the Radio Access Network node to become aware of control related signalling such that it can be processed.

21 Claims, 5 Drawing Sheets

(51) Int. Cl.
H04W 76/22 (2018.01)
H04L 29/06 (2006.01)
H04W 4/24 (2018.01)

(56) References Cited

U.S. PATENT DOCUMENTS

| | | | | |
|---|---|---|---|---|
| 2009/0073919 | A1* | 3/2009 | Chen | H04L 63/0272 370/328 |
| 2009/0291631 | A1* | 11/2009 | Xue | H04L 12/1836 455/3.01 |
| 2011/0069654 | A1* | 3/2011 | Xu | H04B 7/2606 370/315 |
| 2011/0274042 | A1* | 11/2011 | Diachina | H04W 4/005 370/328 |
| 2012/0099433 | A1* | 4/2012 | Willars | H04L 29/12066 370/241 |
| 2013/0121282 | A1* | 5/2013 | Liu | H04W 28/08 370/329 |
| 2013/0301611 | A1* | 11/2013 | Baghel | H04W 72/04 370/331 |
| 2014/0185438 | A1* | 7/2014 | Patel | H04W 28/06 370/230 |

OTHER PUBLICATIONS

AT&T: Interface between GGSN and Policy Control Point, TSG-SA Working Group 2, S2-000947, Berlin, Germany, May 22-26, 2000.

\* cited by examiner

SERVICE LAYER CONTROL AWARE CONTROL SIGNALLING IN A COMMUNICATION NETWORK

This application is a 371 of International Application No. PCT/EP2013/061301, filed May 31, 2013, the disclosure of which is fully incorporated herein by reference.

TECHNICAL FIELD

The present invention relates to the field of communication networks, and in particular to sending Service Layer Control Aware control signalling in a communication network, and identifying and handling received Service Layer Control Aware control signalling.

BACKGROUND

In recent years, network operators have been increasingly adopting a cloud computing model which provides users with access to fully featured applications, to software development and deployment environments without needing to maintain large amounts of data at an end-user device. Furthermore, cloud computing allows network-accessible data storage and processing, again taking load away from the end-user device and into the network.

Service Layer Control (SLC) Aware services can be introduced using cloud computing. SLC Aware services are services in which nodes in the service network are aware of, for example, conditions in the Radio Access Network (RAN) and may adjust the service provided to the end user accordingly. SLC Aware services may also provide service related information to the RAN, so that the RAN may utilize this to achieve higher resource efficiency or other benefits. SLC Aware services therefore require some signalling between the service network and the RAN.

Charging in mobile networks is performed by different core network and service network nodes. Charging can be divided into online charging and offline charging, and is described in 3GPP TS 32.240. Charging may be volume based, time based or event based. Charging is initiated when a first packet arrives, and the usage is then measured according to the configured charging method. The GGSN (or PGW) initiates different types of Credit Control (CC) signalling towards the Online Charging System (OCS) at different actions, such as session request, service request and deletion of session. The GGSN (or PGW) receives a quota from the OCS and may need to request a further quota when the current quota for a UE (or subscription) is almost used.

Zero-charging mentioned above is a concept in which traffic passing through the GGSN or PGW is identified as belonging to a traffic flow that is not subject to a charge. An example of this is SLC Aware control signalling between the RAN and the service network. There is currently no way to achieve this.

Furthermore, a UE 1 is capable of using multiple simultaneous bearers in which different data flows to the same UE 1 use different bearers. These may require different processing. However, there is no mechanism for providing SLC Aware control signalling that can identify different bearers.

SUMMARY

It is an object to provide a mechanism to identify SLC Aware control signalling in order to, for example, process SLC Aware control signalling and zero-rate SLC Aware control signalling.

According to a first aspect, there is provided a method of handling SLC Aware control signalling associated with a data flow of a User Equipment (UE). A Radio Access Network (RAN) node is associated with the UE. The RAN node receives a data flow comprising a plurality of data packets sent using a bearer towards the UE. It determines whether a data packet in the data flow includes an identifier indicating that the data packet relates to SLC Aware control signalling. A data packet that is found to relate to SLC Aware control signalling is removed from the data flow, to produce a modified data flow, which is sent towards the UE. This has the advantage of allowing the RAN to become aware of SLC Aware control related signalling such that it can be processed. Furthermore, it need not be sent to the UE.

As an option, the data packet relating to SLC Aware control signalling comprises the same Traffic Flow Template (TFT) parameters as other data packets sent using the bearer. This has the advantage of allowing it to be sent over the same bearer as the other data packets.

Any suitable identifier may be used. Examples of identifiers include a predefined bit sequence known to the RAN node, a predefined value in any of an unused IP header option and a traffic protocol header, an identifying field in the packet, an erroneous checksum value in a transport protocol header, and a modified checksum value.

As an option, the RAN node processes the data packet relating to SLC Aware control signalling as SLC Aware control signalling. This allows the RAN node to exchange signalling with an SLC node.

According to a second aspect, there is provided a method of sending SLC Aware control signalling. A SLC node identifies a data flow from a service provider towards a UE, the data flow being subject to SLC Aware control. It sends a SLC Aware control packet towards a RAN. The SLC Aware control packet includes parameters extracted from at least one data packet of the identified data flow such that the SLC Aware control packet will be sent on a same bearer as the data flow, the SLC Aware control packet including information identifying the packet as a SLC Aware control packet. This has the advantage of allowing the SLC node to send SLC Aware control signalling towards the UE using the same bearer as the data flow, such that it can be intercepted and by a RAN node.

As an option, the SLC Aware control packet relating to SLC Aware control signalling is provided with the same TFT parameters as another data packet in the data flow, allowing the SLC Aware control packet to be sent on the same bearer as the data flow.

Exemplary information identifying the packet as a SLC Aware control packet includes a predefined bit sequence known to the RAN node, a predefined value in any of an unused IP header option and a traffic protocol header, an identifying field in the packet, an erroneous checksum value in a transport protocol header, and a modified checksum value.

According to a third aspect, there is provided a method of sending SLC Aware control signalling. A core network user plane gateway receives from a SLC node a SLC Aware control packet.

The control packet includes parameters extracted from at least one data packet of a data flow sent towards a UE, and also includes information identifying the packet as a SLC Aware control packet. The core network user plane gateway sends the control packet on a same bearer as the data flow sent towards the UE.

As an option, the core network user plane gateway zero-rates the control packet for the purposes of charging.

Such packets can be identified by the identifier (for example, a predefined bit sequence known to the RAN node, a predefined value in any of an unused IP header option and a traffic protocol header, an identifying field in the packet, an erroneous checksum value in a transport protocol header, and a modified checksum value).

According to a fourth aspect, there is provided a RAN node for use in a RAN. The RAN node is provided with a receiver for receiving a data flow comprising a plurality of data packets sent using a bearer towards a UE. A processor is arranged to determine whether a data packet in the data flow includes an identifier indicating that the data packet relates to SLC Aware control signalling. The processor is further arranged to remove a data packet that is determined to relate to SLC Aware control signalling to produce a modified data flow. A transmitter is provided for sending the modified data flow towards the UE.

As an option, the identifier identified by the processor is any of a predefined bit sequence known to the RAN node, a predefined value in any of an unused IP header option and a traffic protocol header, an identifying field in the packet, an erroneous checksum value in a transport protocol header, and a modified checksum value.

As an option, the processor is further arranged to process the data packet relating to SLC Aware control signalling as SLC Aware control signalling.

According to a fifth aspect, there is provided a SLC node for use in a communication network. The SLC node is provided with a processor arranged to identify a data flow from a service provider towards a UE. The data flow is subject to SLC Aware control. A transmitter is provided for sending a SLC Aware control packet towards the UE, the SLC Aware control packet including parameters extracted from at least one data packet of the identified data flow such that the SLC Aware control packet will be sent on a same bearer as the data flow. The SLC Aware control packet also includes information identifying the packet as a SLC Aware control packet.

As an option, the processor is arranged to identify TFT parameters associated with the data flow and apply the same TFT parameters to the SLC Aware control packet. This allows the SLC Aware control packet to be sent using the same bearer.

The information identifying the packet as a SLC Aware control packet is optionally an of a predefined bit sequence known to the RAN node, a predefined value in any of an unused IP header option and a traffic protocol header, an identifying field in the packet, an erroneous checksum value in a transport protocol header, and a modified checksum value.

According to a sixth aspect, there is provided a core network user plane gateway. The gateway is provided with a receiver arranged to receive from a SLC node a SLC Aware control packet. The control packet includes parameters extracted from at least one data packet of a data flow sent towards a UE, and also information identifying the packet as a SLC Aware control packet. A processor is provided for sending the control packet on a same bearer as the data flow sent towards the UE. A transmitter is provided for sending, on the bearer, the data flow including the control packet.

According to a seventh aspect, there is provided computer program comprising computer readable code which, when run on a RAN node, causes the RAN node to perform the method as described above in the first aspect.

According to an eighth aspect, there is provided a computer program comprising computer readable code which, when run on a SLC node, causes the SLC node to perform the method as described above in the second aspect.

According to a ninth aspect, there is provided a computer program comprising computer readable code which, when run on a core network user plane gateway, causes the core network user plane gateway to perform the method as described above in the third aspect.

According to a tenth aspect, there is provided a computer program product comprising a non-transitory computer readable medium and a computer program as described above in any of the seventh, eighth or ninth aspects, wherein the computer program is stored on the computer readable medium.

DETAILED DESCRIPTION

SLC Aware services can be provided via a distributed cloud model in a Radio Access Network (RAN) and/or in other places in a cellular telecommunications network. A distributed cloud combines existing cloud computing with access to additional RAN-specific services. This means that applications run close to or within the RAN network, thereby reducing load in other parts of the network and ensuring fewer delays between the cloud computing resource and the end-user. It also allows applications to make use of information available from the RAN. For example, if an application provides streaming video to the end-user, and network conditions deteriorate, then the application becomes aware of the deterioration in the network conditions. It can then modify the quality, size, packet size and so on of the streamed video to compensate from the deteriorating conditions and to reduce the risk of network conditions deteriorating further.

Figure 1:
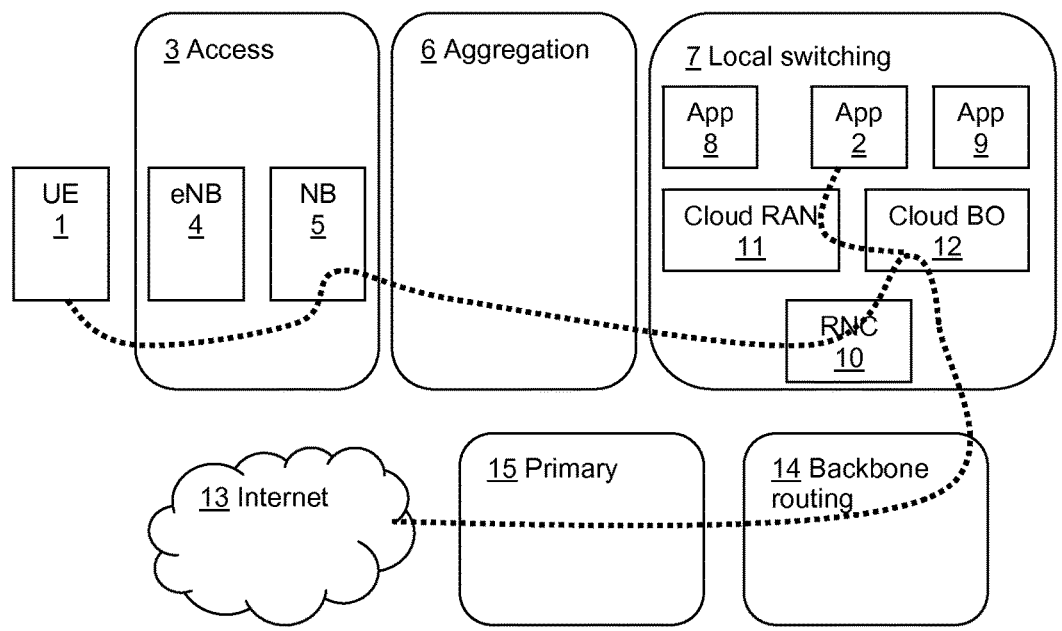
FIG. 1 illustrates schematically in a block diagram an exemplary distributed cloud network.

The distributed cloud in the RAN provides local processing, local storage and high speed access to APIs providing services from the radio access network. FIG. 1 illustrates a distributed cloud network. In this case, a User Equipment (UE) 1 receives streaming video from an application 2. The UE 1 accesses an access site 3 via a node such as an eNodeB (eNB) 4, or a NodeB (NB) 5. Signalling from the access site 3 is sent via an aggregation site 6 to a local switching site 7 that hosts applications 2, 8, 9 along with a Radio Network Controller (RNC) 10, a cloud RAN node 11 and a cloud breakout (BO) node 12. The cloud breakout node 12 is a traffic selection function that controls which data traffic is sent to the cloud platform (in other words, the cloud RAN 11) and which traffic is forwarded towards the Internet 13 via a backbone routing site 14 and a primary site 15. The cloud BO 12 hosts normal core network functions, for example the core network of a Long Term Evolution (LTE) network.

Such functions may include both a Serving GW (SGW) and a Packet Data Network Gateway (PGW) that provide connectivity between the UE 1 and the Internet (or another packet data network).

The distributed cloud functions such as the cloud RAN 11 and the cloud breakout function 12 are located between the applications and the UE 1. As mentioned above it may be located inside or nearby the RAN, e.g. collocated with RAN nodes, but it may also be located in, or partly distributed to other places in the cellular network architecture, such as above the core network, e.g. outside the PGW (above the SGi interface) in Evolved Packet System (EPS) networks. In networks other than EPS networks, an equivalent node to the PGW is, for example, a GPRS Support Node (GGSN) in Wideband Code Division Multiple Access (WCDMA)/ High-Speed Packet Access (HSPA) or UMTS network, and the interface equivalent to the SGi interface is the Gi interface. This type of node is referred to herein as a user plane gateway. By distributing the user plane gateways between the applications and the UE 1, existing user plane gateway functionality, such as mobility handling, charging, lawful/legal intercept and Policy/Quality of Service (QoS) Control can be maintained. Note that RAN specific information may still be accessible to the applications via control signalling. In such deployment scenarios, the user plane gateways as well distributed cloud entities may be located at a primary site or distributed more locally, e.g. to a local switching site together with an RNC.

Note that the local switching site 7 is normally the RAN site where, for example, GSM Base Station Controllers (BSC) and WCDMA/HSPA RNCs are located. In the case of LTE or 3G HSPA, the functionality typically located at the local switching site 7 may be located at the access site 3 together with the eNB 4 (or a distributed RNC together with NB 24 in the case of HSPA). It will be appreciated that other configurations of a distributed cloud network may be realised.

As described above, the distributed cloud concept is a SLC Aware network and provides SLC Aware network functions. SLC Aware network functions exploit an information exchange between the mobile network domain and the service domain to enhance performance. In a similar way, SLC Aware RAN functions exchange information between the mobile network RAN domain and the service domain. Cache and video optimization can be performed, in which the information exchange is from the service domain to the RAN domain and indicates content characteristics to optimize RAN buffering, transmission and state handling. Information exchange in the other direction, from the RAN domain to the service domain is also valid for other use cases such as the described case of providing information about deteriorating network conditions from the RAN domain to the service domain.

Figure 2:
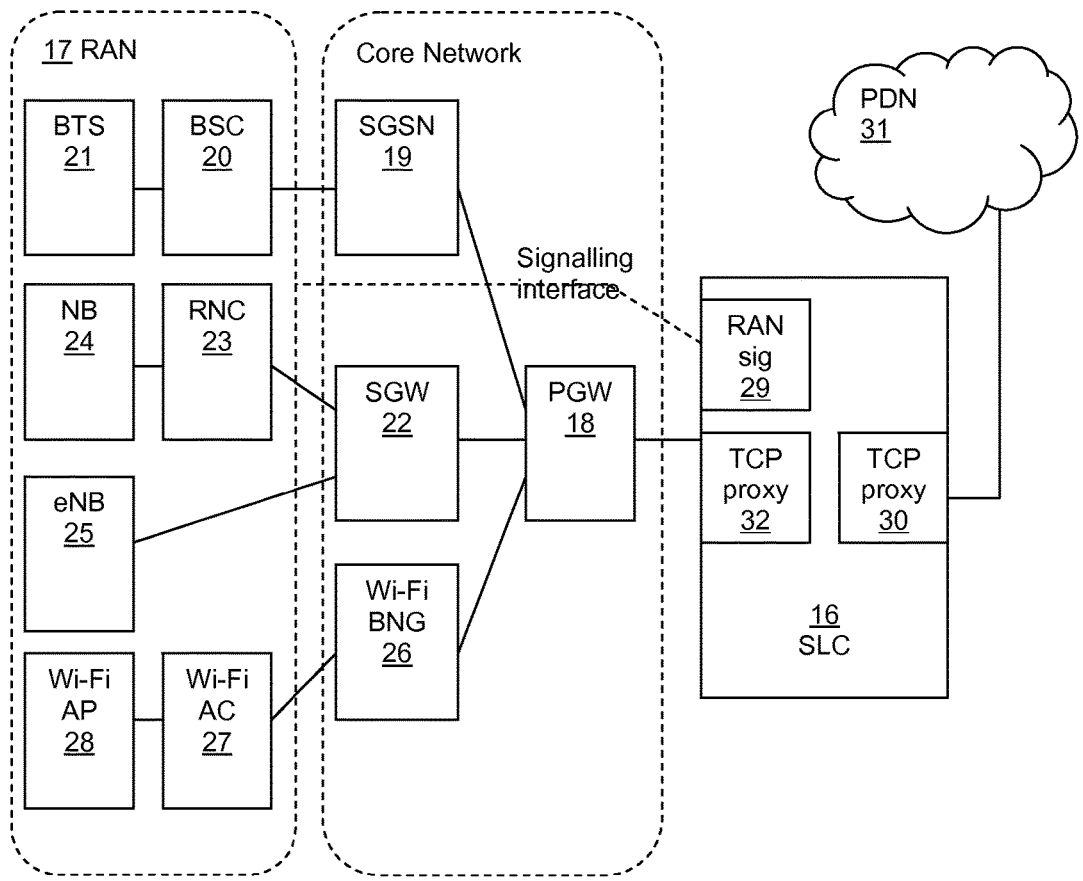
FIG. 2 illustrates schematically in a block diagram a service layer control (SLC) node and simplified associated network.

A function termed a Service Layer Control (SLC) function 16 is illustrated in FIG. 2. The SLC 16 handles the information exchange with a RAN 17. According to the present invention, this information exchange is transported in the form of control signalling via the PGW or GGSN. Different RANs may use different Radio Access Technologies (RAT), as shown in FIG. 2. For example, a PGW 18 or GGSN may forward signalling via a SGSN 19 to a BSC 20 and a Base Transceiver Station (BTS) 21 in the RAN 17. Alternatively, the PGW 18 may forward signalling via a Serving Gateway (SGW) 22 to a RNC 23 and a NodeB 24, or a GGSN may forward signalling via a SGSN 19 to a RNC 23 or directly to a RNC, bypassing the SGSN. Alternatively, the PGW 18 may forward signalling towards an eNB 25 via the SGW 22. Where the RAN 17 is a Wi-Fi access network, the PGW 18 forwards signalling via a Broadband Network Gateway (BNG) 26 towards a Wi-Fi Access Controller (AC) 27 and a Wi-Fi Access Point (AP) 28.

FIG. 2 shows examples of how the signalling may traverse between the SLC 16 and the RAN 17 via the different nodes, but it will be appreciated that other network architectures and signalling are possible. For example, in the WCDMA/HSPA case, a SGSN could be placed between the RNC 23 and the SGW 22. Another example is that in the GSM case, the SGSN 19 could be connected to the PGW 18 via the SGW 22. In addition, FIG. 2 also shows how the Wi-Fi access network is connected to the PGW 18. The illustrated Wi-Fi access network is an exemplary deployment and contains a Wi-Fi AP 28, a Wi-Fi AC 29 and a BNG 26. In another example, the Wi-Fi AP may be co-located with a Residential Gateway (RG). In a further example, the Wi-Fi network may also comprise a Trusted WLAN Access Gateway (TWAG).

For the SLC 16 to interface with the RAN 17, a new interface is required as no such interfaces currently exist. The SLC 16 comprises a RAN signalling function 29 to communicate with the RAN 17. In an optional embodiment, as shown in FIG. 2, it may also comprise a first Transmission Control Proxy (TCP) proxy function 30 to communicate with a node or server in the Packet Data Network (PDN) 31 and a second TCP proxy function 32 to communicate with a UE via the PGW 18. In many cases the first TCP proxy function 30 and the second TCP proxy function 32 are combined to a single TCP proxy.

As described above, it is preferred that the SLC 16 is located between the PGW 18 and the PDN 31. This ensures that modified user plane data flows resulting from SLC Aware Functions in the SLC 16 are subject to PGW 18 functions such as charging and Lawful Intercept. Furthermore, it is preferred that the SLC 16 and the RAN 17 can be deployed independently of the core network.

It is proposed to introduce a user plane based solution for RAN information exchange between the SLC 16 and the RAN 17. This provides SLC Aware control signalling between the SLC 16 and the RAN 17. SLC Aware control signalling refers to signalling between a RAN node and a SLC control node that allows information to be exchanged between the RAN node and the SLC control node. For example, the RAN node may use SLC Aware control signalling to inform the SLC control node about conditions in the RAN, allowing the SLC control node to modify data sent from a service node towards the UE. Similarly, the SLC control node may use SLC Aware control signalling to inform the RAN node about upcoming service layer data sent towards the UE, allowing the RAN node to better allocate resources.

SLC Aware Control packets are inserted in the user data flow. For example, in the downlink, an IP-based control packet is sent towards the UE's IP address. The IP packet is first routed to the PGW 18 where the UE's IP address has its Point-of-Presence. The PGW 18 selects the correct UE 1 and bearer and forwards the IP-packet towards the RAN 17 through a GTP tunnel that is associated with the selected bearer. This arrangement simplifies mobility as the UE's GTP-tunnel is automatically moved to the UE's current serving RAN node. The method of inserting SLC Aware Control packets in the user data flow requires a variant of packet marking (e.g. protocol header marking on different protocol layers or other ways described below) so that the RAN 17 can identify and remove any SLC Aware Control packets before forwarding other packets to the UE 1. A similar arrangement is proposed for the uplink. In this case, IP-based control packets are inserted by the RAN 17 in the UE's GTP-U tunnel for a specific bearer towards the core network (another alternative is to use any of the UE's bearers, e.g. a best effort bearer such as the default bearer in EPS). There are different alternatives for how the RAN 17 constructs the uplink SLC Aware Control packets. A first alternative is that the UE's IP address is used as a source IP address, and a destination IP address is the IP-address of the SLC 16. In another alternative, the IP packets for the uplink SLC Aware Control packets from the RAN 17 to the SLC 16 use the same 5-tuple as the IP flow related to the signalling. This enables the SLC 16 to associate a received signalling packet to a specific data flow. In addition, the packet marking described for the downlink case is also needed for the uplink signalling so that the SLC 16 can identify the SLC Aware Control packets and extract them from the data flow and so that the PGW/SGW or GGSN may apply zero-rating for this signalling traffic.

The SLC model described above assumes use of a user plane based solution for RAN information exchange. However, this solution does not provide any mechanism for applying RAN information signalling per bearer. In addition, it is difficult to apply zero-rating for this traffic in the PGW/SGW or GGSN, especially in combination with a non-SLC aware core network.

In order to allow SLC Aware control signalling to be identified on a per-bearer basis, it is proposed to provide SLC Aware control packets with an identifier and inject them into a data flow associated with a bearer. In other words, the control signalling is not sent using a separate control interface, but using the bearer associated with the data flow that is subject to SLC Aware control and triggered the control packet, and whose treatment the control packet concerns.

In order to allow the control packets to be injected into the data flow and to a specific bearer, they must simulate regular data packets, so that the PGW (or GGSN) matches it with the same TFT packet filter as the concerned data flow. However, they must be identifiable in order to be recognized by nodes such as RAN nodes that must process the SLC Aware control packets.

The following description uses the example of an eNB 25 as a node in a RAN 17, but it will be appreciated that any such node could be substituted for the eNB in the following description depending on the RAT. For example, a RAN node could be a BSC 20, a BTS 21, a RNC 23, a NB 23, a Wi-Fi AC 27 or a Wi-Fi AP 28.

Figure 3:
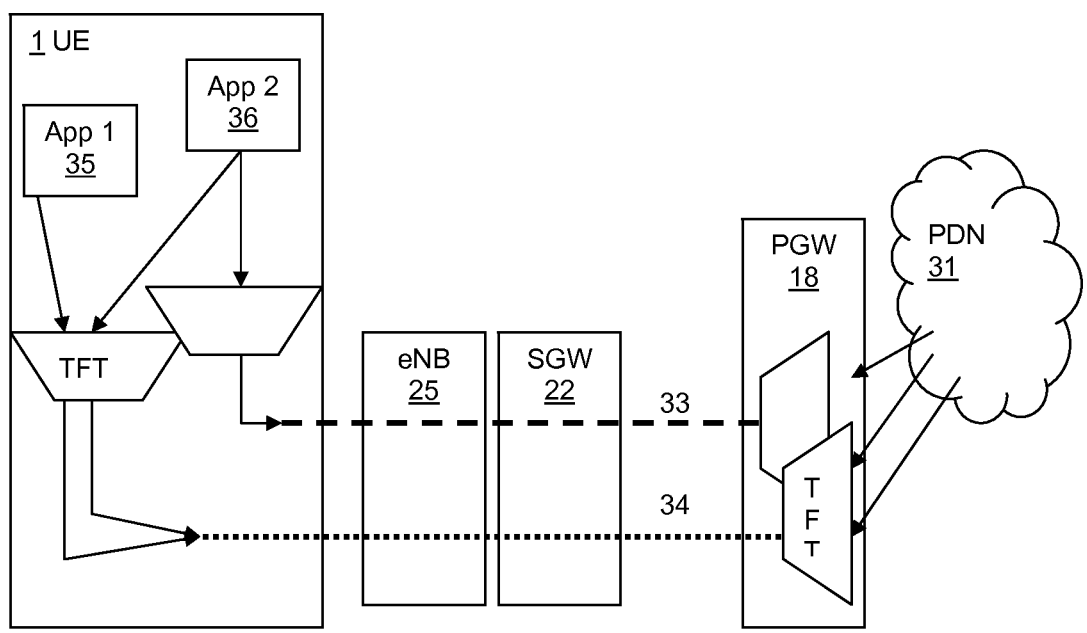
FIG. 3 illustrates schematically in a block diagram a User Equipment using two bearers.

FIG. 3 shows a simplified example of a case when the UE 1 uses two bearers and the UE 1 is connected to a LTE/E-UTRAN network. Bearer 33 is a default bearer and bearer 34 is an additional bearer. A number of Traffic Flow Templates (TFT) is used by the PGW 18 in the downlink to select which of the bearers a specific IP-packet should be forwarded to. The UE 1 also uses TFTs in the uplink direction. The default bearer 33 has no TFT, as all traffic that is not captured by any other TFTs is forwarded on the default bearer. However, bearer 34 is provided with a number (one or more) of TFTs. In this example, a first application 35 at the UE 1 is using bearer 34 and a second application 36 is using bearers 33 and 34.

The TFT is typically a 5-tuple defining the source and destination IP addresses, source and destination port as well as protocol identifier (e.g. UDP or TCP). Addresses and ports may be indicated as single values or ranges of values. It is also possible to define other types of packet filters based on other parameters related to an IP flow, for example Source Address and Subnet Mask, Protocol Number (IPv4)/Next Header (IPv6), Destination Port Range, Source Port Range, IPsec SPI, TOS (IPv4)/Traffic Class (IPv6) and Mask, and Flow Label (IPv6).

To ensure that SLC Aware control packets injected into the bearer are sent in the same way as regular data packets forming part of the data flow, the SLC 16 monitors user data flows. The SLC 16 copies the TFT control parameters (e.g. the IP 5-tuple and other information) from the packets of an identified data flow, e.g. denoted target flow, and uses the same TFT control parameters for IP packets that carry the SLC Aware control signalling. The SLC 16 typically does not have any knowledge of which parameters the matching TFT in the PGW uses to identify the target flow. In order to match the same TFT, the SLC copies all parameters from the target flow packets that may potentially be included in a TFT. Although this includes more parameters than a five-tuple, for simplicity the set of copied TFT parameters is referred to herein as a five-tuple. The five-tuple, consisting of source and destination IP addresses, source and destination transport protocol (e.g. TCP, UDP or SCTP) port numbers and the protocol field (IPv4) or next header field (IPv6) (which are the most commonly used TFT control parameters) is copied from the target flow packets. To ensure that the SLC Aware control packets are placed on the same bearer as the data flow, also the TOS field (IPv4) Traffic Class field (IPv6) and Flow Label field (IPv6) should be copied. Note that it is possible to copy a possible Security Parameter Index (SPI) from the data packets in the data flow, but typically IPsec protected user data flows are not subject to any actions from the SLC 16.

By copying TFT control parameters and using them for SLC Aware control packets, the SLC Aware control packets appear the same as user data packets belonging to the existing data flow, from the point of view of the TFT analysis in a PGW/GGSN. However, the SLC Aware control packets must also include information that can be used by the receiving eNB 25 (or other RAN 17 nodes) to identify them as SLC Aware control packets. Another optional use for such identification information is to make the SLC Aware control packets identifiable and subject to zero-charging in the PGW/SGW or GGSN. The PGW/SGW or GGSN needs to be able to map the control packets to the correct bearer for the UE 1 and simultaneously apply zero-charging.

The eNB 25 that receives the data flow inspects each user data packet to the depth needed to determine whether the data packet is user data or is a SLC Aware control packets. Once the eNB has identified a SLC Aware control packet, it can process it and remove it from the data flow before sending the remaining packets in the data flow on towards the UE 1.

Figure 4:
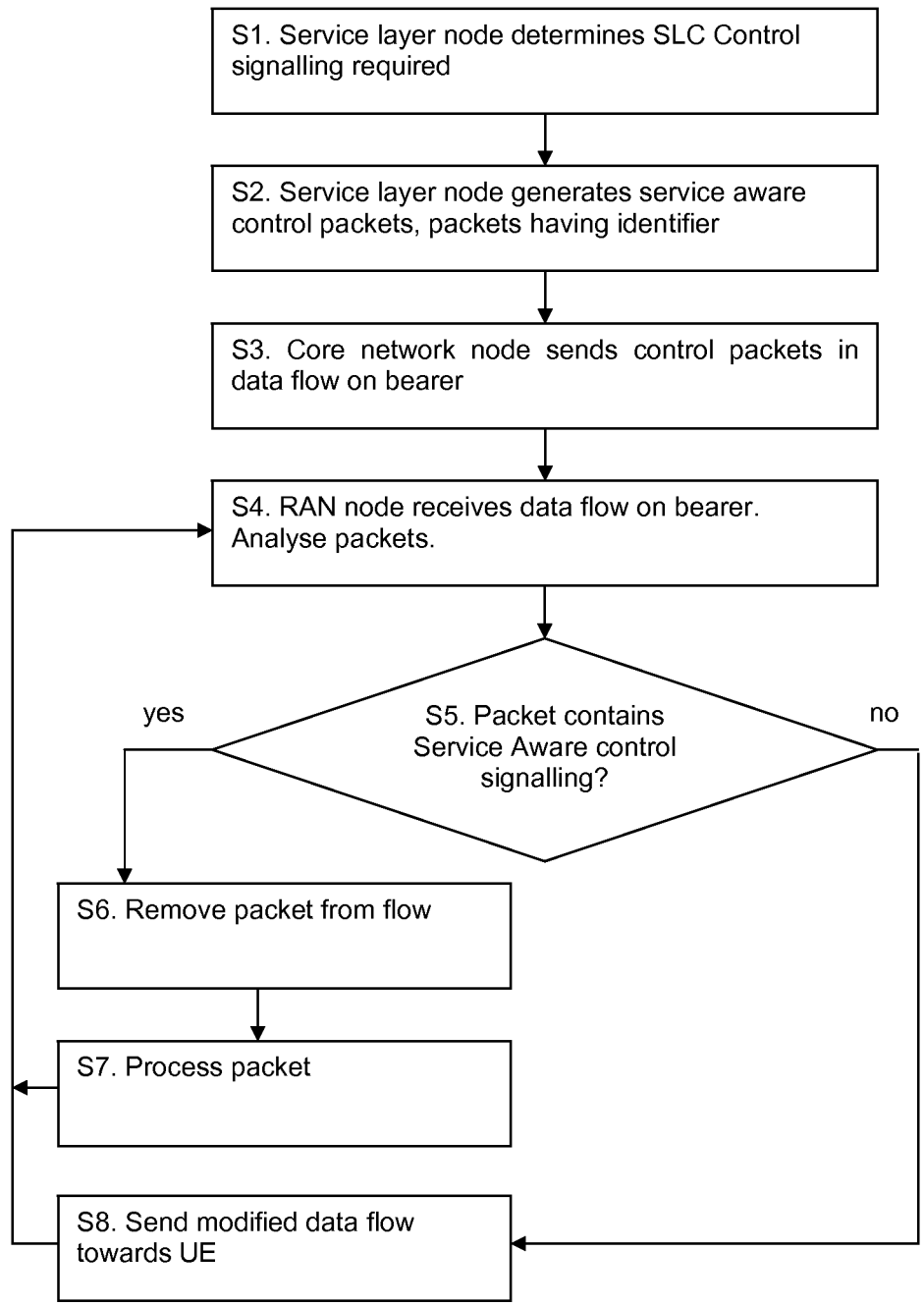
FIG. 4 is a flow diagram showing exemplary steps.

FIG. 4 is a flow diagram illustrating exemplary steps. The following numbering corresponds to that of FIG. 4:

S1. The SLC 16 monitors a data flow and determines that SLC Aware control signalling is required. As an alternative, the SLC 16 may receive an explicit request from a SLC Aware application/service for such control signalling to be applied to a certain data flow. In the latter case, such a request may come in the form of SLC Aware control information to be forwarded by the SLC 16 to the RAN node, i.e. in this case the eNB 25.

S2. The SLC 16 injects SLC Aware control packets into the data flow. The packets are injected in such a way that, from the point of view of intermediate nodes between the SLC 16 and the eNB 25, they appear to be regular user data packets in the data flow. In this way, the control packets can subsequently be sent in a bearer between the PGW 18 and the UE 1. One way to achieve this, as described above, is to copy the potential TFT parameters from the user data packets and re-use them for the SLC Aware control packets. In addition, an identifier is added to the SLC Aware control packets. In addition to making the SLC Aware control packets identifiable for the receiving RAN node, i.e. the eNB 25, a possible optional purpose of this identifier is to enable nodes such as the PGW 18 to apply zero-charging to these control packets.

S3. The data packets and the control packets are sent to a core network node, such as a PGW 18 (via a SGW 22) or a GGSN (optionally via a SGSN 19) depending on the network. At this point, the core network node can zero-rate the control packets for the purposes of zero-charging based on the identifier. The PGW 18 or GGSN is also able to map the SLC Aware control packets to the same bearer as is used for the related user data packets due to the usage of the user data packet TFT parameters also for SLC Aware control packets.

S4. The eNB 25 receives the data flow and analyses each packet to determine if any of the data packets forming the data flow are SLC Aware control packets.

S5. In the event that a packet is identified as a SLC Aware control packet, the process continues at step S6. If the packet is a regular user data packet, then no further action is taken and the process continues at step S8.

S6. The identified SLC Aware control packet is removed from the data flow.

S7. The identified SLC Aware control packet is processed (for example, the eNB 25 might respond to a query to send information to the SLC 16 about network conditions). The process then reverts to step S4.

S8. The analysed regular user data packet is forwarded to the UE 1. The process then reverts to step S4.

In another alternative to the flow diagram shown in FIG. 4, the logic handles more than one packet in a flow before forwarding any user data packet to the UE. This allows a SLC control packet in the flow to also impact a user data packet in the flow that was received earlier than the SLC control packet.

There are many different ways that a SLC Aware control packet can be provided with an identifier that allows the eNB 25 (or other RAN 17 node) to determine that it is a SLC Aware control packet. The following description provides examples only, but it will be appreciated that other types of identifier may be used.

A SLC Aware control packet may be identified at the application layer. This could be, for example, in the form of a pre-defined bit sequence at the beginning of the SLC Aware control packet. The pre-defined bit sequence is known to the RAN node, which uses the presence of such a bit sequence at the start of a packet payload (i.e. the payload of a transport layer packet, i.e. the application layer packet) to determine that the packet is a SLC Aware control packet. To avoid the chance that a non-SLC control packet happens to begin with the same bit sequence, the concept may be complemented by a checksum calculation or a message authentication control calculation. In this case, the SLC and the RAN node includes a known (preconfigured or agreed in advance between the SLC 16 and the RAN node) bit sequence (which is not extracted from the packet) in the calculation.

Another way of identifying a SLC Aware control packet is to utilize an unused field in the IP header or in the transport protocol header. This may be any field that is not used as part of the TFT filters. An example is to use a special IPv4 header option field in the single octet option type format. For instance, by setting a two-bit Option Class indicator in an Option Type octet to one of the currently unused values 1 or 3, a dedicated IPv4 header option could be created. This IPv4 header option may only consist of a single octet, i.e. the Option Type octet. The remaining 6 bits of the Option Type octet are the single bit Copy Flag (governing the treatment of the IPv4 header option when the packet is fragmented) and the 5-bit Option Number (which indicates which option it is). The Copy Flag may be set to 1 (indicating that the IPv4 header option should be copied to each packet fragment), but it is also possible for the copy flag to be set to 0. The Option Number field may be set to any arbitrary value as long as it is agreed (preconfigured) by the endpoints. Another example is the usage of the IPv4 Identification field (16 bits, and defined currently as an identifying value assigned by the sender to aid in assembling the fragments of a datagram.). Similar fields can be found in the IPv6 protocol header.

A further way to provide an identifier is to modify the IP header or transport protocol header in a manner that the receiving RAN node can detect, but which does not impact any of the other packet processing procedures that the packet is subject to along its path between the SLC 16 and the receiving RAN node. An exemplary modification is to deliberately include an erroneous checksum in the transport protocol (e.g. TCP, UDP or SCTP) header. For example, a known (preconfigured or agreed in advance between the SLC 16 and the RAN node) bit sequence can be included in addition to the regularly included fields extracted from the packets in the calculation of the checksum.

A further way to provide an identifier is to set the fields of an IP pseudo header (which is used in the regular checksum calculation) to all zeros or some other known bit pattern/sequence in the checksum calculation. A further option is to perform the regular checksum calculation and then add or subtract a known (preconfigured or agreed in advance between the SLC 16 and the RAN node) bit sequence or perform some other operation on the result. For example, the result may be XOR-ed with a known (preconfigured or agreed in advance between the SLC 16 and the RAN node) bit sequence. Yet another way of modifying the transport protocol checksum in a predictable manner is to encrypt it using an encryption key that is based on a security relation between the SLC 16 and the receiving RAN node. A further way to provide an identifier is to always use the same known (preconfigured or agreed in advance between the SLC 16 and the RAN node) bit sequence as the checksum (with a method of ensuring that this bit sequence does not happen to become a correct checksum, for example by using a dummy field in the SLC packet). The above are examples of how the transport protocol header checksum could be modified in a predictable manner that the receiving RAN node can detect. Other similar mechanisms are conceivable. It will be appreciated that the SLC Aware control packets may use one or any combination of the identifiers suggested above. This could be useful if, for example, an eNB 25 is configured to look for one type of identifier and a Wi-Fi AC 27 is configured to look for another type of identifier (provided that the SLC control signalling or other means allows the SLC to be aware of the RAN type, e.g. LTE or WiFi).

In addition to the SLC Aware control signalling being associated with particular user data flows (and bearers), there may be SLC Aware control signalling that is bearer independent, but concerns a specific UE. For such SLC Aware control packets only the UE IP address is copied, thereby ensuring both that the SLC Aware control packets are routed to the correct RAN node, and that the receiving RAN node can identify the concerned UE. Optionally other potential TFT parameters may also be copied or configured by the operator to be set to values which the operator knows will not cause the packet to be discarded in the PGW/GGSN.

Figure 5:
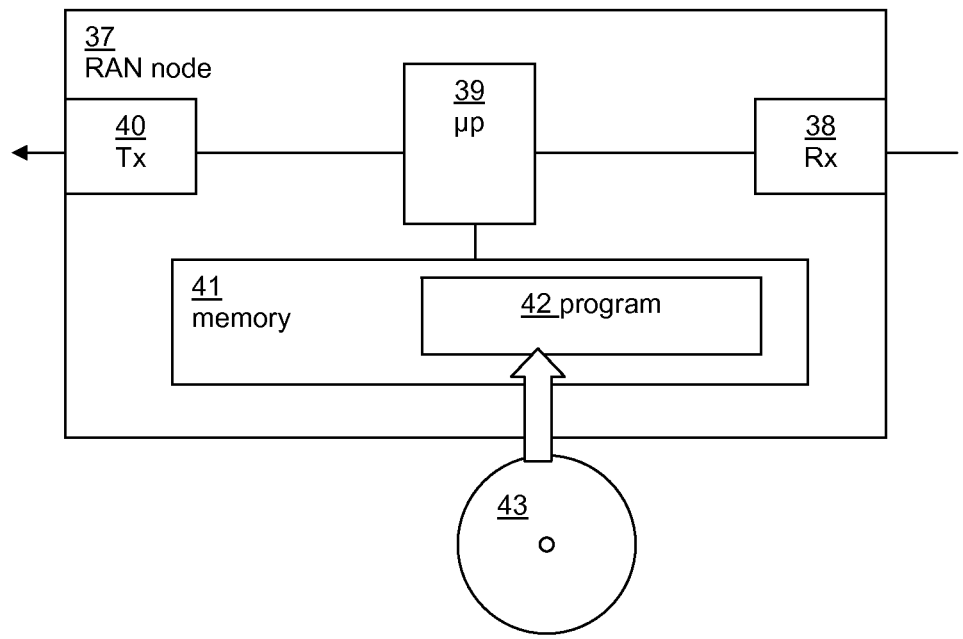
FIG. 5 illustrates schematically in a block diagram an exemplary service layer control node.

FIG. 5 shows an exemplary RAN node 37, such as an eNB 25. The RAN node 37 is provided with a receiver 38 for receiving the data flow sent towards the UE 1. A processor 39 is arranged to determine if any of the packets include an identifier indicating that the packets relate to SLC Aware control signalling. It removes those packets that do relate to SLC Aware control signalling fro the data flow. The modified data flow is sent using a transmitter 40 towards the UE 1. The processor 39 may also be used to process those packets that do relate to SLC Aware control signalling, for example by responding to requests for information about RAN conditions.

A non-transitory computer readable medium in the form of a memory 41 is also provided that may be used for storing a computer program 42. The program 42, when executed by the processor 39, causes the RAN node 37 to behave as described above. Note also that the program 42 may be stored on an external non-transitory computer readable medium in the form of a further memory 43, such as a flash drive.

Figure 6:
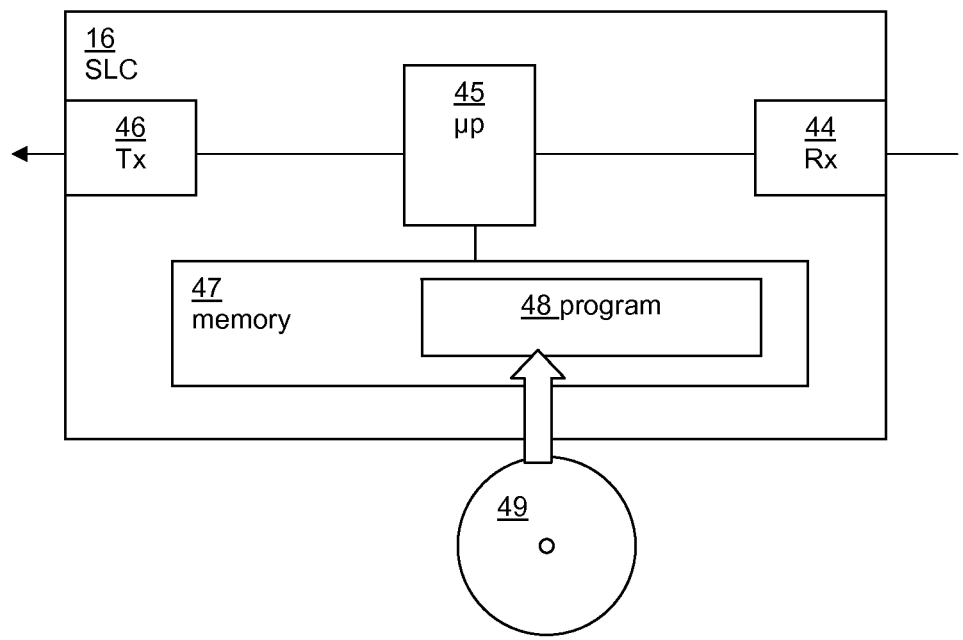
FIG. 6 illustrates schematically in a block diagram an exemplary Radio Access Network node.

FIG. 6 shows an exemplary SLC node 16. It is provided with a receiver 44 for receiving a data flow sent from a service provider towards the UE 1, and a processor 45 for identifying the a data flow. The data flow is subject to SLC Aware control. A transmitter 46 is also provided for sending a SLC Aware control packet towards the UE 1. The SLC Aware control packet includes parameters extracted from at least one data packet of the identified data flow such that the SLC Aware control packet is sent on the same bearer as the data flow. The SLC Aware control packet includes information identifying the packet as a SLC control packet. The processor 45 may be arranged to identify TFT parameters associated with the data flow and apply the same TFT parameters to the SLC Aware control packet, ensuring that it is sent on the same bearer.

A non-transitory computer readable medium in the form of a memory 47 is also provided that may be used for storing a computer program 48. The program 48, when executed by the processor 45, causes the SLC node 16 to behave as described above. Note also that the program 48 may be stored on an external non-transitory computer readable medium in the form of a further memory 49, such as a flash drive.

Figure 7:
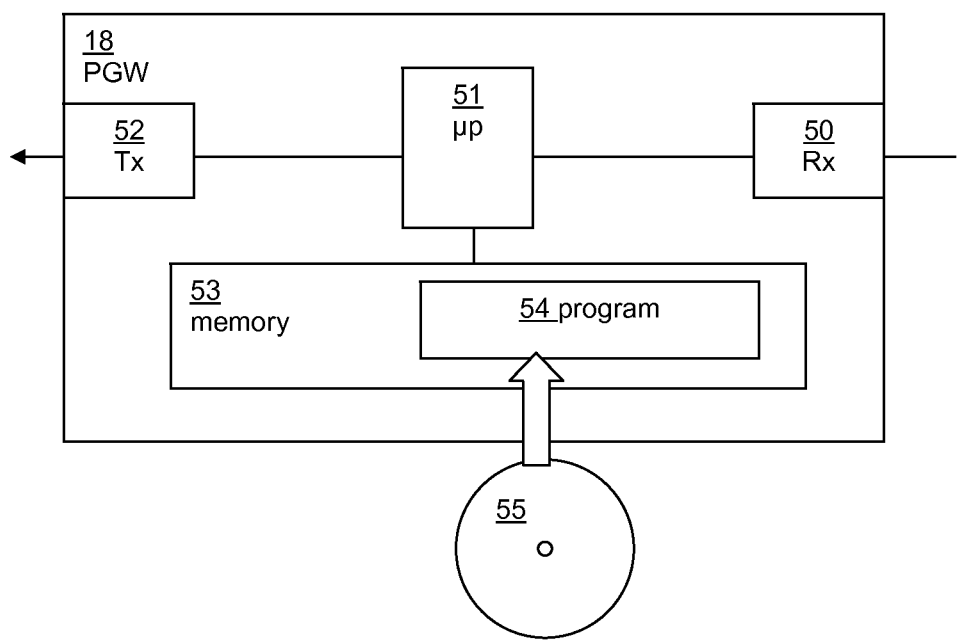
FIG. 7 illustrates schematically in a block diagram an exemplary core network user plane gateway.

FIG. 7 shows a core network user plane gateway such as a PGW 18. It is provided with a receiver 50 for receiving, from the SLC node 16, a Service Layer Control Aware control packet. The control packet includes parameters extracted from at least one data packet of a data flow sent towards the UE 1. The SLC Aware control packet includes information identifying the packet as a SLC Aware control packet. A processor 51 is provided for sending the control packet on the same bearer as the data flow sent towards the UE 1, and a transmitter 52 is provided for sending the data flow including the control packet.

A non-transitory computer readable medium in the form of a memory 53 is also provided that may be used for storing a computer program 54. The program 54, when executed by the processor 51, causes the core network user plane gateway 18 to behave as described above.

Note also that the program 54 may be stored on an external non-transitory computer readable medium in the form of a further memory 55, such as a flash drive.

The described solution ensures that charging can be avoided for the SLC Aware control packets by utilizing Packet Inspection functionality in the PGW/GGSN in the same way as the RAN node identifies the SAP control packets.

It will be appreciated by the person of skill in the art that various modifications may be made to the above-described embodiments without departing from the scope of the present invention as described in the appended claims. The description above is given for the LTE/E-UTRAN case. However, the invention applies equally well also to other RATs like the WCDMA/HSPA/UTRAN, GSM/GERAN and Wi-Fi.

The following abbreviations have been used in this specification:
3GPP 3rd Generation Partnership Project
AC Access Controller
AP Access Point
BNG Broadband Network Gateway
BSC Base Station Controller
BTS Base Transceiver Station
CC Credit Control
DPI Deep Packet Inspection
eNB evolved NodeB
EPS Evolved Packet System
E-UTRAN Evolved Universal Terrestrial Radio Access Network
GGSN Gateway GPRS Support Node
GPRS General Packet Radio Service
GSM Global System for Mobile communication
GTP GPRS Tunnelling Protocol
HSPA High-Speed Packet Access
LTE Long Term Evolution
NB NodeB
OCS Online Charging System
PDN Packet Data Network
PDN-GW Packet Data Network Gateway (same as PGW)
PGW Packet Data Network Gateway,
QoS Quality of Service
RAN Radio Access Network
RAT Radio Access Technology
RNC Radio Network Controller
SAF SLC Aware Function
SGSN Serving GPRS Support Node
SGW Serving Gateway
SLC Service Layer Control
SPI Security Parameter Index
TCP Transmission Control protocol
TFT Traffic Flow Template
UDP User Datagram Protocol
UE User Equipment
WCDMA Wideband Code Division Multiple Access

The invention claimed is:

1. A method implemented by a Radio Access Network (RAN) node for handling Service Layer Control Aware control signalling associated with a data flow of a User Equipment, the method comprising:
receiving, by the RAN node, a data flow comprising a plurality of data packets sent using a bearer towards the User Equipment;
determining, by the RAN node, whether a data packet in the data flow includes an identifier indicating that the data packet relates to Service Layer Control Aware control signalling;
removing, by the RAN node, from the data flow a data packet that is determined to relate to Service Layer Control Aware control signalling to produce a modified data flow; and sending, by the RAN node, the modified data flow towards the User Equipment.

2. The method according to claim 1, wherein the data packet relating to Service Layer Control Aware control signalling comprises the same Traffic Flow Template parameters as other data packets sent using the bearer.

3. The method according to claim 1, wherein the identifier comprises any of:
- a predefined bit sequence known to the Radio Access Network node;
- a predefined value in any of an unused IP header option and a traffic protocol header;
- an identifying field in the packet;
- an erroneous checksum value in a transport protocol header; and
- a modified checksum value.

4. The method according to claim 1, further comprising processing, by the RAN node, the data packet relating to Service Layer Control Aware control signalling as Service Layer Control Aware control signalling.

5. A method implemented by a service layer control node for sending Service Layer Control Aware control signalling, the method comprising:
- identifying, by the service layer control node, a data flow from a service provider towards a User Equipment, the data flow being subject to Service Layer Control Aware control; and
- sending, by the service layer control node, a Service Layer Control Aware control packet towards a Radio Access Network, the Service Layer Control Aware control packet including parameters extracted from at least one data packet of the identified data flow such that the Service Layer Control Aware control packet will be sent on a same bearer as the data flow, the Service Layer Control Aware control packet including information identifying the packet as a Service Layer Control Aware control packet.

6. The method according to claim 5, further comprising providing, by the service layer control node, the Service Layer Control Aware control packet relating to Service Layer Control Aware control signalling with the same Traffic Flow Template parameters as another data packet in the data flow, allowing the Service Layer Control Aware control packet to be sent on the same bearer as the data flow.

7. The method according to claim 5, wherein the information identifying the packet as a Service Layer Control Aware control packet comprises any of:
- a predefined bit sequence known to the Radio Access Network node;
- a predefined value in any of an unused IP header option and a traffic protocol header;
- an identifying field in the packet;
- an erroneous checksum value in a transport protocol header; and
- a modified checksum value.

8. A method implemented by a core network user plane gateway for sending Service Layer Control Aware control signalling, the method comprising:
- receiving, by the core network user plane gateway, from a service layer control node a Service Layer Control Aware control packet, the Service Layer Control Aware control packet including parameters extracted from at least one data packet of a data flow sent towards a User Equipment, the Service Layer Control Aware control packet including information identifying the packet as a Service Layer Control Aware control packet; and
- sending, by the core network user plane gateway, the Service Layer Control Aware control packet on a same bearer as the data flow sent towards the User Equipment.

9. The method according to claim 8, further comprising zero-rating the Service Layer Control Aware control packet for the purposes of charging.

10. A Radio Access Network (RAN) node for use in a Radio Access Network, the RAN node comprising:
- a receiver configured to receive a data flow comprising a plurality of data packets sent using a bearer towards a User Equipment;
- a processor configured to determine whether a data packet in the data flow includes an identifier indicating that the data packet relates to Service Layer Control Aware control signalling;
- the processor further configured to remove from the data flow a data packet that is determined to relate to Service Layer Control Aware control signalling to produce a modified data flow;
- a transmitter configured to send the modified data flow towards the User Equipment; and,
- the RAN node comprising the receiver, the processor, and the transmitter.

11. The RAN node according to claim 10, wherein the processor is configured to determine the presence of the identifier, the identifier being selected from any of:
- a predefined bit sequence known to the Radio Access Network node;
- a predefined value in any of an unused IP option and a traffic protocol header;
- an identifying field in the packet;
- an erroneous checksum value in a transport protocol header; and
- a modified checksum value.

12. The RAN node according to claim 10, wherein the processor is further configured to process the data packet relating to Service Layer Control Aware control signalling as Service Layer Control Aware control signalling.

13. A service layer control node for use in a communication network, the service layer control node comprising:
- a processor configured to identify a data flow from a service provider towards a User Equipment, the data flow being subject to Service Layer Control Aware control;
- a transmitter configured to send a Service Layer Control Aware control packet towards the User Equipment, the Service Layer Control Aware control packet including parameters extracted from at least one data packet of the identified data flow such that the Service Layer Control Aware control packet will be sent on a same bearer as the data flow, the Service Layer Control Aware control packet including information identifying the packet as a Service Layer Control Aware control packet; and,
- the service layer control node comprising the processor and the transmitter.

14. The service layer control node according to claim 13, wherein the processor is configured to identify Traffic Flow Template parameters associated with the data flow and apply the same Traffic Flow Template parameters to the Service Layer Control Aware control packet.

15. The service layer control node according to claim 13, wherein the information identifying the packet as a Service Layer Control Aware control packet comprises any of:
- a predefined bit sequence known to the Radio Access Network node;

a predefined value in any of an unused IP header option and a traffic protocol header;

an identifying field in the packet;

an erroneous checksum value in a transport protocol header; and a modified checksum value.

16. A core network user plane gateway comprising:

a receiver configured to receive from a service layer control node a Service Layer Control Aware control packet, the Service Layer Control Aware control packet including parameters extracted from at least one data packet of a data flow sent towards a User Equipment, the Service Layer Control Aware control packet including information identifying the packet as a Service Layer Control Aware control packet; and a processor configured to send the Service Layer Control Aware control packet on a same bearer as the data flow sent towards the User Equipment;

a transmitter configured to send on the bearer the data flow including the Service Layer Control Aware control packet; and the core network user plane gateway comprising the processor and the transmitter.

17. A non-transitory computer readable medium, comprising computer readable code which, when run on a Radio Access Network node causes the Radio Access Network node to perform operations as follows:

receive, by the RAN node, a data flow comprising a plurality of data packets sent using a bearer towards the User Equipment;

determine, by the RAN node, whether a data packet in the data flow includes an identifier indicating that the data packet relates to Service Layer Control Aware control signalling;

remove, by the RAN node, from the data flow a data packet that is determined to relate to Service Layer Control Aware control signalling to produce a modified data flow; and send, by the RAN node, the modified data flow towards the User Equipment.

18. A non-transitory computer readable medium, comprising computer readable code which, when run on a service layer control node causes the service layer control node to perform operations as follows:

identify, by the service layer control node, a data flow from a service provider towards a User Equipment, the data flow being subject to Service Layer Control Aware control; and send, by the service layer control node, a Service Layer Control Aware control packet towards a Radio Access Network, the Service Layer Control Aware control packet including parameters extracted from at least one data packet of the identified data flow such that the Service Layer Control Aware control packet will be sent on a same bearer as the data flow, the Service Layer Control Aware control packet including information identifying the packet as a Service Layer Control Aware control packet.

19. A non-transitory computer readable medium, comprising computer readable code which, when run on a core network user plane gateway causes the core network user plane gateway to perform operations as follows:

receive, by the core network user plane gateway, from a service layer control node a Service Layer Control Aware control packet, the Service Layer Control Aware control packet including parameters extracted from at least one data packet of a data flow sent towards a User Equipment, the Service Layer Control Aware control packet including information identifying the packet as a Service Layer Control Aware control packet; and send, by the core network user plane gateway, the Service Layer Control Aware control packet on a same bearer as the data flow sent towards the User Equipment.

20. The method according to claim 1, wherein the Service Layer Control Aware signalling is signalling to exchange information between the RAN node and a service layer control node.

21. The method according to claim 20, wherein the information comprises information from the service layer control node to inform the RAN node about upcoming service layer data sent towards the User Equipment.

* * * * *